United States Patent Office 3,303,368
Patented Feb. 7, 1967

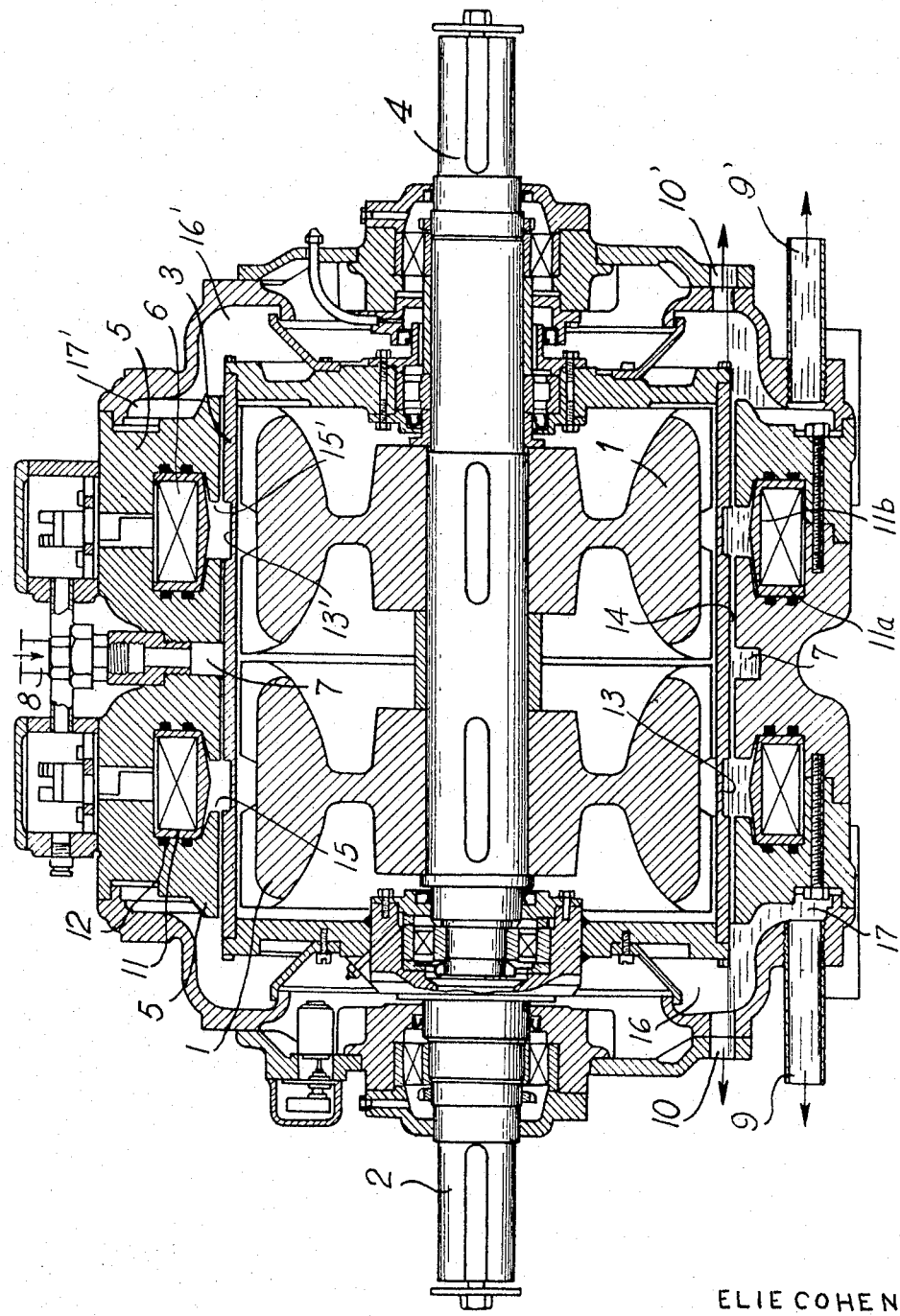

3,303,368
ELECTROMAGNETIC EDDY-CURRENT COUPLING OR BRAKING DEVICES
Elie Cohen, 89 bis Rue Bobillot, and Szymon Roth, 18 Blvd. Barbes, both of Paris, France
Filed June 26, 1963, Ser. No. 290,858
Claims priority, application France, June 28, 1962, 902,323, Patent 1,335,045
3 Claims. (Cl. 310—105)

This invention relates to electro-magnetic eddy-current coupling or braking devices.

As is well known, the eddy currents induced in such devices when they are operating generate heat which needs to be dissipated.

It is one object of the present invention to provide an improved eddy-current coupling or braking device in which the heat generated is dissipated more efficiently than in earlier devices of this type.

It is a further object of this invention to provide an eddy-current coupling or braking device in which a liquid coolant is caused to flow around a rotor in which eddy currents are induced.

It is a further object of this invention to provide an eddy-current coupling or braking device in which cooling water is caused to flow around the outer surface of a rotor in which eddy-currents are induced, the water being distributed around the outer surface by the rotary motion of the rotor.

In one particular embodiment, a device according to the invention comprises an inner rotor secured to a first shaft, an outer rotor surrounding the inner rotor and secured to a second shaft coaxial with the first shaft and a stator including exciter coils and surrounding the outer rotor. The central portion of the stator has an annular groove which faces the outer rotor and communicates at an upper part with a pipe supplying a cooling liquid under pressure, there being discharge and overflow apertures for the said liquid on both sides of the stator at a lower part thereof. With this arrangement, the cold liquid issuing through the pipe spreads out on both sides in the gap between the stator and the outer rotor, and after being heated through the absorption of heat generated by this outer rotor flows away through the discharge apertures. By reason of the rotation of this outer rotor and of the narrowness of the gap, the liquid is thrown over the entire outer surface of this rotor, is spread out like a sheet and very effectively "bathes" the rotor. This flow takes place without any marked friction, since the outer surface of the rotor is smooth, and the direction of rotation of the rotor has no influence on the flow of the liquid.

Any liquid may be used as the coolant, including ordinary water. In this case, the exciter coils should preferably be enclosed in a watertight housing of non-magnetic material, consisting, for example, of a hermetically sealed case or of a casing fitted into a cavity in the stator by watertight packings.

In order that the invention can be fully understood one embodiment thereof will now be described, by way of example, with reference to the accompanying drawing, the sole figure of which shows an axial section of an eddy-current coupling or braking device according to the invention.

In this drawing an inner rotor 1 of the coupling is provided with salient poles and is rigidly fixed to a shaft 2, and a smooth outer rotor 3 of the coupling is rigidly fixed to a shaft 4. A stator 5 is provided with exciter coils 6 for the eddy-current coupling device.

In the central part of the stator there is a channel or groove 7 communicating at the top with a feed pipe 8 for a cooling liquid. This liquid spreads out on each side of the pipe, through the gap 14 between the stator and the outer rotor, over the entire outer surface of the outer rotor and escapes through lower outlets 9 and 9' at both sides of the stator. Other holes 10 and 10' are situated at a higher level than the openings 9 and 9' and serve as overflow and aeration holes.

The exciter coils 6 are enclosed in liquid-tight, welded casings 11, fitted into cavities in the stator with the aid of packing or sealing rings 12. The casings 11 consist each of a pair of annular radial-plane flanges 11a bridged by an annular web 11b. These casings are seated in respective annular recesses 15, 15' of the stator and are so held therein, in the region of their flanges, that the webs are exposed substantially over their entire inner surfaces to liquid coolant which passes from the annular clearance 14 into annular depressions 13, 13' on the outer surface of rotor 3 confronting the recesses 15, 15'. Clearance 14 also opens into a pair of annular compartments 16, 16', defined by the end walls of stator 5 and confronting wall surfaces of rotor 3, these compartments in turn communicating with two annular passages 17, 17' having the outlets 9, 9' located at their lowermost points. It will be noted that passages 17, 17', located on opposite sides of coils 6, have radii greater than those of the coils for effective cooling of the coil casings 6 by the water issuing from clearance 14 on its way to ports 9, 9'.

Although there has been described and shown what is considered to be a preferred embodiment of the invention, it will be apparent that many changes may be made without departing from the essential spirit of the invention. It is intended, therefore, in the annexed claims to cover all such changes and modifications as fall within the scope of the invention.

We claim:

1. An eddy-current coupling or braking device, comprising:
    an axially extending inner rotor having a plurality of axially spaced sets of salient poles forming respective annular arrays;
    a cylindrical outer rotor axially extending along and enclosing said arrays while coaxially surrounding same and having a generally smooth outer surface;
    a stator coaxially surrounding said outer rotor and defining therewith a narrow clearance around said surface, said stator having a plurality of annular recesses disposed about said outer rotor in radial alignment with the respective arrays of poles;
    a set of exciter coils each received in a respective one of said recesses for electromagnetically co-operating with the respective array of poles;
    inlet means for admitting a liquid coolant to said clearance between said coils and including at least one annular channel formed in said stator between said coils and opening into said clearance in the direction of said surface, said stator having respective annular grooves communicating with said recesses and opening into said clearance, said surface being formed with a plurality of axially spaced annular depressions respectively aligned with said grooves and opening in the direction of said stator, said stator being formed with a pair of lateral annular passages on opposite sides of said coils and with radii greater than those of said coils, said stator further having end walls axially spaced from confronting wall surfaces of said outer rotor and defining therewith a pair of annular compartments communicating with said annular passages, respectively, and with said clearance; and
    outlet means including a pair of outlet ports at opposite axial ends of said stator respectively communicating with said annular passages substantially at the lowest point thereof for discharging the liquid coolant therefrom.

2. A device as defined in claim 1 wherein said inlet means includes a liquid-feed pipe for supplying said coolant to said channel at an elevated pressure, further comprising vent means leading from said compartments to the atmosphere above said outlet means.

3. A device as defined in claim 1 wherein each of said coils is received in a respective annular casing having a pair of annular radial-plane flanges and an annular web bridging said flanges, said web being exposed over substantially its entire inner surface to liquid coolant in said clearance by way of the respective annular recess which engages said casing only in the vicinity of said flanges.

References Cited by the Examiner
UNITED STATES PATENTS

| | | | |
|---|---|---|---|
| 2,367,163 | 1/1945 | Winther | 310—105 X |
| 2,419,837 | 4/1947 | Hugin | 310—105 X |
| 3,054,007 | 9/1962 | Munson | 310—105 |

MILTON O. HIRSHFIELD, *Primary Examiner.*
DAVID X. SLINEY, *Examiner.*